US011287816B2

(12) United States Patent
Panzica et al.

(10) Patent No.: US 11,287,816 B2
(45) Date of Patent: Mar. 29, 2022

(54) NAVIGATIONAL CONSTRAINTS FOR AUTONOMOUS VEHICLES

(71) Applicant: Uber Technologies, Inc., San Francisco, CA (US)

(72) Inventors: Adam Panzica, Pittsburgh, PA (US); Brett Bavar, Pittsburgh, PA (US); Julie Derence, Pittsburgh, PA (US); Marcial Hernandez, Pittsburgh, PA (US); Tashwin Khurana, Pittsburgh, PA (US); Bryan Nagy, Pittsburgh, PA (US); Jordan Romaidis, Pittsburgh, PA (US); Adrian Rechy Romero, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 286 days.

(21) Appl. No.: 16/434,501

(22) Filed: Jun. 7, 2019

(65) Prior Publication Data

US 2019/0377342 A1 Dec. 12, 2019

Related U.S. Application Data

(60) Provisional application No. 62/683,191, filed on Jun. 11, 2018.

(51) Int. Cl.
*G05D 1/00* (2006.01)
*G08G 1/00* (2006.01)
*G01C 21/34* (2006.01)

(52) U.S. Cl.
CPC ....... *G05D 1/0088* (2013.01); *G01C 21/3492* (2013.01); *G05D 1/0027* (2013.01); *G08G 1/20* (2013.01)

(58) Field of Classification Search
CPC .............. G05D 1/0088; G05D 1/0027; G01C 21/3492; G01C 21/343; G01C 21/3461; G08G 1/20
See application file for complete search history.

(56) References Cited

U.S. PATENT DOCUMENTS 8,260,485 B1   9/2012 Meuth
8,521,352 B1   8/2013 Ferguson
(Continued)

FOREIGN PATENT DOCUMENTS

CN    107194575    9/2017
CN    107479558    12/2017
(Continued)

OTHER PUBLICATIONS

ISR and Written Opinion dated Aug. 13, 2019 in PCT/US2019/030341.

(Continued)

*Primary Examiner* — Marthe Y Marc-Coleman
(74) *Attorney, Agent, or Firm* — Mahamedi IP Law LLP

(57) ABSTRACT

A computing system can generate a map constraint interface enabling a fleet operator to update map constraints for autonomous vehicles (AVs). The map constraint interface can comprise a unified document model enabling the fleet operator to configure a set of constraint layers of autonomy maps utilized by the AVs. Each constraint layer can include a toggle feature that enables the fleet operator to enable and disable the constraint layer. The system can receive, via the map constraint interface, a set of inputs configuring the set of constraint layers of the one or more autonomy maps, compile a set of updated map constraints, corresponding to the configured set of constraint layers, into a document container, and output the document container to a subset of the AVs to enable the subset of AVs to integrate the set of updated map constraints with the autonomy maps.

20 Claims, 7 Drawing Sheets

(56) References Cited

U.S. PATENT DOCUMENTS

| | | | |
|---|---|---|---|
| 8,630,958 | B2 | 1/2014 | Carlsson |
| 8,825,265 | B1 | 9/2014 | Ferguson |
| 8,996,224 | B1 * | 3/2015 | Herbach ............. G05D 1/0044 |
| | | | 701/23 |
| 9,494,439 | B1 | 11/2016 | Ross |
| 9,612,123 | B1 | 4/2017 | Levinson |
| 9,701,020 | B1 | 7/2017 | Ebrahimi |
| 9,852,475 | B1 | 12/2017 | Konrardy |
| 9,946,531 | B1 | 4/2018 | Fields |
| 10,152,053 | B1 | 12/2018 | Smith |
| 10,162,355 | B2 | 12/2018 | Hayon |
| 10,395,332 | B1 | 8/2019 | Konrardy |
| 2005/0273253 | A1 | 12/2005 | Diekhans |
| 2007/0027592 | A1 | 2/2007 | Tolkacz |
| 2009/0138188 | A1 | 5/2009 | Kores |
| 2010/0036606 | A1 | 2/2010 | Jones |
| 2011/0208745 | A1 | 8/2011 | Dietsch |
| 2012/0310691 | A1 | 12/2012 | Carlsson |
| 2014/0193348 | A1 | 7/2014 | Wang |
| 2014/0214259 | A1 | 7/2014 | Trepangnier |
| 2015/0057871 | A1 | 2/2015 | Ono |
| 2015/0266490 | A1 | 9/2015 | Coelingh |
| 2015/0268058 | A1 | 9/2015 | Samarasekera |
| 2015/0336270 | A1 | 11/2015 | Storr |
| 2015/0339928 | A1 | 11/2015 | Ramanujam |
| 2016/0306960 | A1 | 10/2016 | Gajulapalli |
| 2016/0370194 | A1 | 12/2016 | Colijn |
| 2017/0123421 | A1 | 5/2017 | Kentley |
| 2017/0132117 | A1 | 5/2017 | Stefan |
| 2017/0139411 | A1 | 5/2017 | Hartung |
| 2017/0191846 | A1 | 7/2017 | Chintakindi |
| 2017/0213308 | A1 | 7/2017 | Wellborn |
| 2017/0248963 | A1 | 8/2017 | Levinson |
| 2017/0262790 | A1 | 9/2017 | Khasis |
| 2017/0364090 | A1 | 12/2017 | Grufman |
| 2018/0018874 | A1 | 1/2018 | McNew |
| 2018/0053423 | A1 | 2/2018 | Dacosta |
| 2018/0067966 | A1 | 3/2018 | Oder |
| 2018/0107770 | A1 | 4/2018 | Cahoon |
| 2018/0130095 | A1 | 5/2018 | Khoury |
| 2018/0188045 | A1 | 7/2018 | Wheeler |
| 2018/0245929 | A1 | 8/2018 | Watanabe |
| 2018/0253109 | A1 | 9/2018 | Fontaine |
| 2018/0293687 | A1 | 10/2018 | Hardee |
| 2018/0308191 | A1 | 10/2018 | Matthiesen |
| 2018/0308363 | A1 | 10/2018 | Duncan |
| 2018/0315146 | A1 | 11/2018 | Matthiesen |
| 2018/0328745 | A1 | 11/2018 | Nagy |
| 2018/0329428 | A1 * | 11/2018 | Nagy ................... G05D 1/0088 |
| 2018/0339712 | A1 | 11/2018 | Kislovskiy |
| 2018/0340790 | A1 | 11/2018 | Kislovskiy |
| 2018/0341261 | A1 | 11/2018 | Kislovskiy |
| 2018/0341276 | A1 | 11/2018 | Kislovskiy |
| 2018/0341571 | A1 | 11/2018 | Kislovskiy |
| 2018/0341880 | A1 | 11/2018 | Kislovskiy |
| 2018/0341881 | A1 | 11/2018 | Kislovskiy |
| 2018/0341887 | A1 | 11/2018 | Kislovskiy |
| 2018/0341888 | A1 | 11/2018 | Kislovskiy |
| 2018/0341895 | A1 | 11/2018 | Kislovskiy |
| 2018/0342033 | A1 | 11/2018 | Kislovskiy |
| 2018/0342034 | A1 | 11/2018 | Kislovskiy |
| 2018/0342113 | A1 | 11/2018 | Kislovskiy |
| 2019/0146513 | A1 | 5/2019 | Tomita |
| 2019/0208695 | A1 | 7/2019 | Graf Plessen |
| 2019/0325546 | A1 | 10/2019 | Hagestad |

FOREIGN PATENT DOCUMENTS

| | | |
|---|---|---|
| WO | WO 2017/079222 | 5/2017 |
| WO | WO 2017/092904 | 8/2017 |
| WO | WO 2017/172415 | 10/2017 |
| WO | WO 2018/042853 | 3/2018 |
| WO | WO 2018/111260 | 6/2018 |
| WO | WO 2019/023324 | 1/2019 |

OTHER PUBLICATIONS

Thimbleby, Harold, "The directed Chinese postman problem", Software Practice and Experience, 2003, vol. 33, pp. 1081-1096 (2003).

Kazemi, Leyla, "Optimal Traversal Planning in Road Networks with Navigational Constraints", Proceedings of the 15th International Symposium on Advances in Geographic Information Systems, ACMGIS '07, Nov. 7-9, 2007, Seattle, WA 8 pages (2007).

Carlsson, John Gunnar, "Practical distributed vehicle routing for street-level map Scanning", published 2009 atwww.semanticscholar. org, 14 pages (2009).

Carlsson, John Gunnar, "A geometric framework for resource allocation problems", Proceedings of 2009 NSF Engineering Research and Innovation Conference (CMMI), Honolulu, Hawaii, 6 pages (2009).

Kwan, Mei-Ko, "Graphic programming using odd or even points", Chinese Mathematics (American Mathematical Society), vol. 1, pp. 273-277 (1962).

Edmunds, Jack "Matching, Euler tours and the Chinese Postman", Mathematical Programming 5, 88-124, North-Holland Publishing Company (1973).

Groetschel, Martin, "Euler, Mei-Ko Kwan, Koenigsberg, and a Chinese Postman", Documenta Mathematica—Extra vol. ISMP, pp. 43-50 (2012).

WRO in PCT/US2019/030341 dated May 14, 2020.

IPRP in PCT/US2019/030341 dated Aug. 4, 2020.

IPRP in PCT/US2019/028396 dated Oct. 29, 2020.

ISR and Written Opinion dated Jul. 17, 2019 in PCT/US2019\028396.

Darrell Etherington, Daimler to operate self-driving cars on Uber's network, Jan. 31, 2017.

Vania de Oliviera Neves, An environment to support structural testing of autonomous vehicles, 2014, pp. 19-24, https:// ieeexplore. ieee.org/stamp/stamp.jsp?tp+ &arnumber = 7091160 (Year: 2014).

Simona Gifei, Integrated Management System for Qulity, Safety and Security in Developing Autonomous Vehicles, Mar. 2017, pp. 673-676 https:// ieeexplore.ieee.org/stamp/stamp.jsp?tp+ &arnumber = 7905041 (Year: 2017).

ISR and Written Opinion dated Jul. 29, 2018 in PCT/US2018/033092.

Federico Giaimo, Design Criteria to Architect Continuous Experimentation for Self-Driving Vehicles, 2017, pp. 203-210, https:// ieeexplore.ieee.org/stamp/stamp.jsp?tp=&arnumber= 7930218 (Year: 2017).

Philip Koopman, Autonomous Vehicle Safety: An Interdisciplinary Challenge, 2017, pp. 90-96, https://ieeexplore. ieee.org/stamp/stamp. jsp?tp= &arnumber=7823109 (Year: 2017).

Baekgyu Kim, Testing Autonomous Vehicle Software in the Virtual Prototyping Environment, 2017, pp. 5-8 https://ieeexplore.ieee.org/stamp/stamp.jsp?tp=arnumber=7797233 (Year: 2017).

* cited by examiner

NAVIGATIONAL CONSTRAINTS FOR AUTONOMOUS VEHICLES

CROSS REFERENCE TO RELATED APPLICATION

This application claims the benefit of priority to U.S. Provisional Application No. 62/683,191, filed on Jun. 11, 2018, which is hereby incorporated by reference in its entirety.

TECHNICAL FIELD

The present disclosure relates generally to the implementations of map constraints for autonomous vehicles (AVs).

BACKGROUND

An AV may be capable of sensing its environment and navigating along a travel route without human input. In particular, an AV can observe its surrounding environment using a variety of sensors and can attempt to comprehend the environment by performing various processing techniques on data collected by the sensors. Given knowledge of its surrounding environment, the AV can determine an appropriate motion plan relative to a travel route through its surrounding environment.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
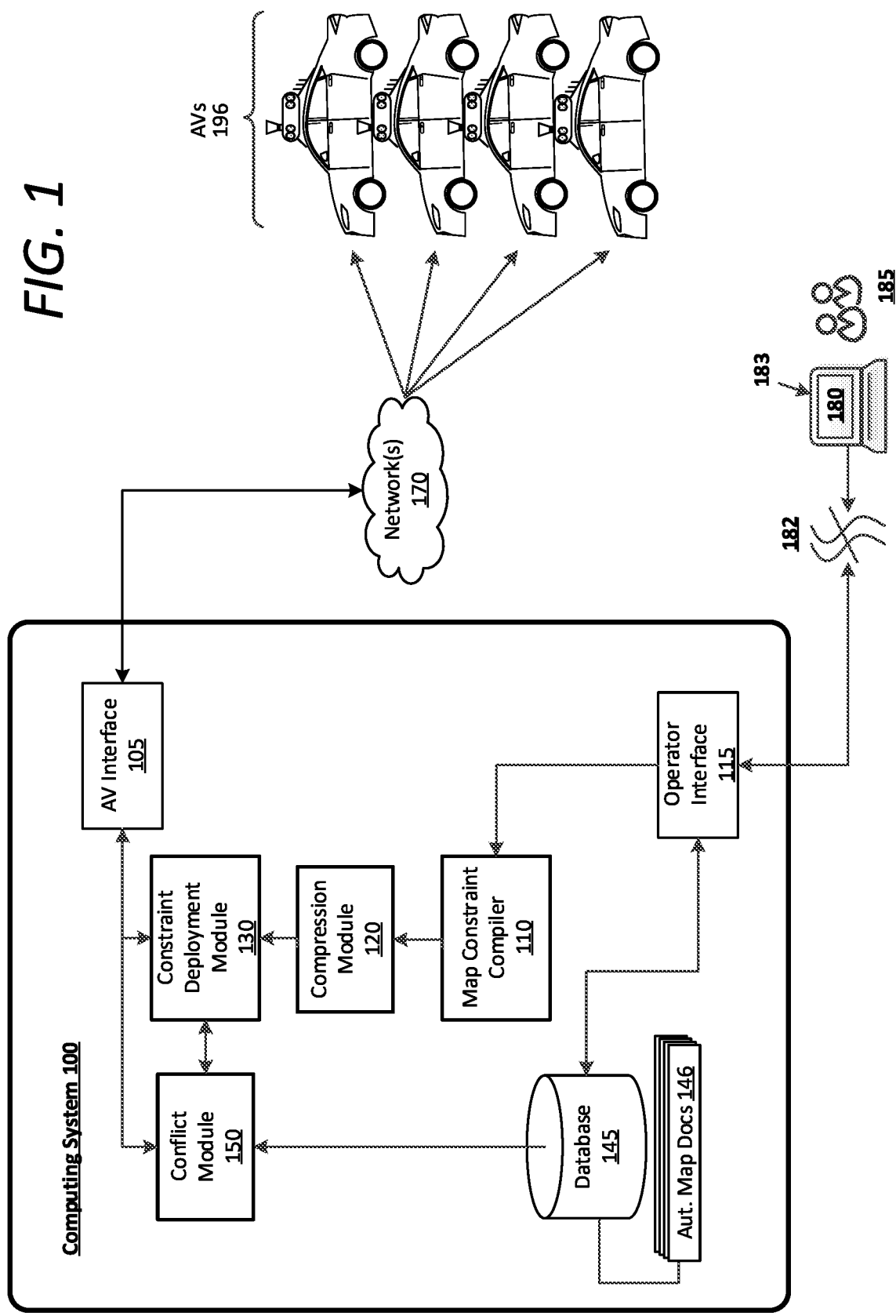
FIG. 1 depicts an example computer system for outputting map constraints to AVs, according to example embodiments of the present disclosure.

Aspects and advantages of embodiments of the present disclosure will be set forth in part in the following description, or may be learned from the description, or may be learned through practice of the embodiments.

Autonomous vehicles (AVs) can utilize previously recorded surface maps or street level maps (e.g., autonomy maps stored on board the AV) to autonomously drive along various routes. For example, a control system of the AV can dynamically compare real-time sensor data (e.g., LIDAR and/or image data from a set of cameras and/or LIDAR sensors) to a corresponding autonomy map to identify objects of interest, such as pedestrians, other vehicles, bicyclists, or any other potential hazards while autonomously driving the AV through a particular route segment. Each autonomy map can correspond to a route segment (e.g., an intersection or a road segment between intersections), and may be initially recorded by sensors (e.g., stereoscopic cameras and/or LIDAR sensors) on recording vehicles or other AVs. The autonomy map may then be manually or computationally processed to incorporate labels (e.g., in metadata), such as entry points and exit points into and out of the autonomy map, traffic rule labels, traffic signal labels, and the like.

During processing, such labeling of an autonomy map can further be merged with a set of underlying rules for AVs utilizing the autonomy map for navigation. This set of rules and labels can comprise an initial or existing policy that the AVs are to abide by when autonomously operating on the route segment corresponding to the autonomy map. As an example, the policy can include a hard rule that the AV is not to perform an unprotected left turn action at a particular intersection. Thus, the policy can impart on the autonomy map a logical barrier which the AV control system can treat as a forbidden action in a particular lane and at a particular intersection. When a policy or collective set of policies is finalized, the final set of autonomy maps may be uploaded or otherwise provided to AVs operating throughout a given region. The collection of autonomy maps can correspond to an autonomy grid comprising a series of road segments in a road network (e.g., the Pittsburgh, Pa. metropolitan area) throughout which the AVs are capable of operating autonomously.

In various examples, changes to route environments of the autonomy grid, such as road construction, repainting of lane markings, and the like, can cause a current autonomy map to be stale, and can require an update to the current autonomy map. This relatively labor-intensive process can involve a rerecording of the route segment, relabeling, and updating the existing policy for the route segment. Once this process is performed, the updated autonomy map is uploaded or otherwise provided to the AVs. Furthermore, more granular information that may be valuable to the AVs (e.g., a label indicating a blind driveway or more temporary information, such as a temporary lane closure) may be impracticable to incorporate into each updated autonomy map.

To address the inefficiencies and/or shortcomings of the above processes, a unified document model is described herein that enables fleet operators to generate map constraints on existing autonomy maps, and update existing policies without the need for constructing a new autonomy map. The unified document model can comprise a map constraint interface that provides increased flexibility for the fleet operator to construct updated map constraints for the AVs. As described herein, these map constraints are categorized in accordance with the sequenced operations performed by the AV. For example, the categories can comprise a perception constraint category, an object prediction constraint category, and/or a navigational constraint category.

For each category, the fleet operator can amend an existing autonomy map using a map constraint interface of the unified document model, and accessing an autonomy map document that corresponds directly with the existing autonomy map used by the AVs for autonomous navigation.

The fleet operator can interact with the autonomy map document to configure a set of map constraint layers that dictate and/or notify the AV of the manner in which to treat particular route portions within the existing autonomy map. Using the autonomy map document, corresponding to the existing autonomy map on-board the AV, the fleet operator can configure a shape of a map constraint layer (e.g., a polygon that includes a route segment or intersection) which is overlaid on the autonomy map document. Within the category, the fleet operator can also select a particular constraint action or "effect" for the map constraint layer. For example, in the navigational constraint category, the fleet operator can select an effect comprising a forbidden routing constraint (e.g., the AV is forbidden to enter the route segment), an autonomy mode routing constraint (e.g., the AV is only permitted to operate through the route segment in manual mode), or a high-cost avoidance constraint (e.g., the map constraint establishes an artificial high risk cost for the route segment to induce the AV to search for route alternatives) to apply to the map constraint layer. The map constraint interface can further include a toggle feature, which the fleet operator can utilize to activate and deactivate the map constraint layer.

As an example, a route portion of the autonomy map document may be overlaid with multiple map constraint layers. In the navigational constraint category, the route portion may be overlaid with a forbidden routing constraint layer and an autonomy mode routing constraint layer. To prevent conflicting layers, the layers can be configured in accordance with a subsumption order (e.g., either manually configured by the fleet operator or automatically applied). The subsumption order comprises a hierarchy to which the AV is to treat the multiple layers. For example, the forbidden routing constraint layer, when activated, can override all lower order subsumption layers in the navigational constraint category for the particular route portion.

As described herein, the unified document model enables the fleet operator to apply any number of map constraint layers, in any shape, to a particular autonomy map document. Furthermore, each map constraint layer can readily be activated or deactivated using a toggle feature on the map constraint interface. Thus, for a given autonomy map document, the fleet operator can configure route portions on the autonomy map document to be layered with various map constraints of different categories (e.g., navigational constraints, perception constraints, prediction constraints, etc.), each toggled as activated or deactivated. In various examples, the fleet operator may also provide targeted annotations readable by the AV control system, which can provide the AV with contextual information that can affect one or more of the sequential AV operations (e.g., perception, prediction, or motion planning). For example, the fleet operator can provide annotations indicating a blind driveway or a pothole for the perception operations of the AV. As another example, the fleet operator can provide annotations indicating a frequent deer crossing for both perception and prediction operations of the AV. In certain implementations, the map constraint interface can further enable the fleet operator to select AVs to the autonomy map document is to be sent.

In accordance with embodiments described herein, the unified document model can comprise a series of autonomy map documents readily editable by the fleet operator in the manner described herein. Thus, the fleet operator can access any autonomy map document and, for example, toggle (activate or deactivate) existing map constraint layers, create new map constraint layers, and provide annotations for any route portion of the autonomy grid map. For example, if a construction project is scheduled for a certain route segment, the fleet operator can access the corresponding autonomy map document via the map constraint interface, and append an annotation to the document indicating the construction zone, and/or activate a particular navigational constraint to either forbid the AV from entering the construction zone, or cause the AV to be routed around it.

Once a set of autonomy map documents is finalized, the fleet operator can select a finalization or deploy feature on the map constraint interface. The computer system can respond to deployment selection by flattening or compressing the map constraint layers of each document into a document image, and compiling the document images representing each autonomy map document into a document container. The document container may then be transmitted over-the-air to the selected AVs. On-board, the AVs can merge the document images of each autonomy map document into the corresponding existing autonomy map. Accordingly, using the unified document model architecture described herein, the existing policy can be updated without the need for providing an entirely new autonomy map release.

In certain implementations, the map constraint interface may also provide a policy mask feature, that enables the fleet operator to override an entire existing policy utilized by the AVs. For example, an AV may operate in accordance with an existing policy using an autonomy map for a current route segment. The existing policy can comprise a set of labels and or rules (e.g., initial map constraints) that the AV must abide by when traversing the current route segment. The map constraint interface can provide a policy mask feature that causes the entire policy to be overridden in favor of an updated policy (or a new set of map constraints).

The unified document model can be managed by a computer system that comprises a communication interface communicating, over one or more networks, with AVs that utilize autonomy maps to navigate throughout a given region. The computer system can generate the map constraint interface enabling the fleet operator to update map constraints for the AVs. In doing so, the computer system can receive, via the map constraint interface, a set of inputs configuring a set of constraint layers of one or more autonomy map documents corresponding to one or more autonomy maps. The computer system may then compile the autonomy map documents comprising a set of updated map constraints corresponding to the configured set of constraint layers, into a document container, and output the document container to a subset of AVs to enable the subset of AVs to integrate the set of updated map constraints with the on-board autonomy maps.

The computer system can also tabulate, in metadata of a given autonomy map document, a set of lane identifiers such as entry point identifiers and exit point identifiers of selected route portions to which a given set of map constraints apply. In further examples, the computer system can generate metadata for the document indicating a creation time for the document, a number of constraint layers created, a number of constraints created, a number of shapes created, and/or the last time the document was modified and deployed to AVs. Along these lines, the computer system can manage a set of audit logs for tracking the history of map constraint updates based on the generated metadata of each autonomy map document.

In certain implementations, the AV can communicate a constraint management state to the computer system, indicating the operational constraints currently applied by the AV control system. For example, when the AV starts up, the AV can transmit an initial communication of the constraint management state of the AV to the computer system, which can determine whether the AV has applied the current autonomy map updates. If not, then the computer system can transmit a document container comprising the updated autonomy map document images to the AV for integration into the on-board autonomy maps.

Other example aspects of the present disclosure are directed to systems, methods, vehicles, apparatuses, tangible, non-transitory computer-readable media, user interfaces, and memory devices for using map constraints to manage routing and motion of AVs.

The disclosed systems and methods can provide a dynamically configurable system for initializing and updating map constraints (e.g., navigational constraints) in order to effectively manage AVs during specific events (e.g., a traffic accident, sporting event, street fair, construction zone, etc.) and/or specific modes of operation (e.g., with or without human drivers, on-task or off-task from performing a service). In addition, the use of hierarchical constraint data in the form of inclusion and/or exclusion shapes (e.g., polygons) can advantageously provide a flexible configuration for communicating and implementing map constraints.

Identification of events, for which the disclosed constraint data can be determined can come from data descriptive of an upcoming event (e.g., sporting event or the like) and/or historical data (e.g., by approximating navigational limitations based on past events in a particular geographic region at a certain time and/or date). The computer system can utilize various databases to predict, approximate, and/or determine the events and/or geographic locations of anticipated navigational limitations. For example, for different geographic regions, event information (e.g., location, time, and/or date of the event, or the like) can be stored in an event database. Event information can be indicative of whether traffic can be higher or lower at a certain time period (e.g., a time period before the event begins versus a time period when the event is ongoing). In another example, event information can come from calendar databases that indicate important dates (e.g., holidays, first days of school for a city, voting day, or the like). Other examples of outside sources or other stored data (e.g., predicted future, current and/or historic events, conditions, or the like) include weather conditions, news information (e.g., fires, emergency situations, or the like), social information (e.g., via social networking websites), traffic conditions, flight information from airports and/or airlines, or the like, or other information that can assist in determining event information, traffic patterns or other data contributing to potential navigational constraints.

In some implementations, unified document model architecture can provide a highly flexible manner of defining constraints whereby geographic areas for inclusion and/or exclusion can be more broadly defined as opposed to listing out numerous specific route portion identifiers. Map constraint shapes can be added and/or removed from autonomy map documents in order to provide flexible updates to one or more AVs, thus reducing the amount of data communicated remotely to an AV.

The systems, methods, and vehicles described herein have an additional technical effect and benefit of providing more efficient navigation while simultaneously enhancing the safety and security of AVs, passengers, and/or cargo. By providing a mechanism to obtain constraint data, AVs can benefit from the knowledge of when and where potential problem areas may exist for travel routes. A vehicle computing system can determine optimized travel routes or update travel routes by evaluating an updated autonomy map, having merged the configured autonomy map document, in view of real-time sensor data.

The systems, methods, and vehicles described herein also provide an improvement to vehicle computing technology, such as AV computing technology. For instance, aspects of the present disclosure enable AV control systems to more efficiently and accurately control the vehicle's motion using readily deployed autonomy map updates via the updatable documents with map constraint layers provided herein.

System Description

FIG. 1 depicts an example computer system for outputting map constraints to AVs, according to example embodiments of the present disclosure. A computing system 100 includes an AV interface 105 that communicates with a fleet of AVs 196 via one or more networks 170. The computing system 100 further includes a fleet operator interface 115 connected over a network 182 with computing devices 183 operable by fleet operators 185. The computing device 183 can display a map constraint interface 180 enabling the fleet operators 185 to configure map constraints to be merged into the autonomy maps utilized by the AVs 196. The computing system 100 can further include a database 145 storing autonomy map documents 146, as described herein. The computing system 100 can further include a map constraint compiler 110, a compression module 120, and a constraint deployment module 130. In certain aspects, the computing system can further include a conflict module 150 that assures a deployed document container does not conflict with other applicable policies and/or map constraints, which may result in an error condition.

A unified document model is described herein that enables fleet operators 185 to generate map constraints on existing autonomy maps utilized by the AVs 196 to autonomously drive throughout a given region, and update existing policies without the need for constructing a new autonomy map. The unified document model can comprise a map constraint interface 183 accessible via a computing device 183 that provides increased flexibility for the fleet operator 185 to construct updated map constraints for the AVs 196. As described herein, these map constraints are categorized in accordance with sequenced operations performed by the AV 196. For example, the categories can comprise a perception constraint category, an object prediction constraint category, and/or a navigational constraint category.

For each category, the fleet operator 185 can amend an existing autonomy map using a map constraint interface 180 of the unified document model, and access an autonomy map document 146 from the database 146 that corresponds directly with the existing autonomy map used by the AVs 196 for autonomous navigation. As described herein, the fleet operator 185 can interact with the autonomy map document 146 to configure a set of map constraint layers that dictate and/or notify the AV 196 of the manner in which to treat particular route portions within the existing autonomy map.

The computing system 100 can include a map constraint compiler 110 in communication with the fleet operator 185 via the map constraint interface 180. In certain examples, the map constraint compiler 110 can indicate or prevent (e.g., in real-time) any conflicting constraints or layers configured by the fleet operator 185 to ensure robustness of the resultant autonomy maps for use by the AVs 196.

Once a set of autonomy map documents 146 is finalized, the fleet operator 185 can select a finalization or deploy feature on the map constraint interface 180. In response, the map constraint compiler 110 send the map constraint documents with the updated constraint layers to a compression module 120 of the computing system 100. The compression module 120 can flatten or compress the map constraint layers of each document 146 into a document image and compile the document images representing each autonomy map document 146 into a document container.

In various examples, compression module 120 may then send the document container to a constraint deployment module 130 of the computing system 100. The constraint deployment module 130 can transmit the document container over-the-air (e.g., over the networks 170) to the selected AVs 196. In various examples, the AVs 196 can merge the document images of each update autonomy map document 146 into a corresponding existing autonomy map. Accordingly, using the unified document model architecture described herein, the existing policy can be updated without the need for providing an entirely new autonomy map release.

In certain implementations, when an AV 196 comes online or during the starting process of the AV 196, the AV 196 can communicate a constraint management state to the AV interface 105, indicating the operational constraints currently applied by the AV 196 control system. For example, when the AV 196 starts up, the AV 196 can transmit an initial communication of the constraint management state of the AV 196 to the AV interface 105, which can communicate with a conflict module 150 of the computing system 150 to determine whether the AV 196 has applied the current autonomy map updates. If not, then the conflict module 150 can access the updated document container(s) in the database 145 and transmit the document container(s) comprising the updated autonomy map document images to the AV 196 for integration into the on-board autonomy maps.

As provided herein, the unified document model can be managed by the computing system 100 through communication with AVs 196 that utilize the autonomy maps to navigate throughout a given region. The computing system 100 can generate the map constraint interface 180 enabling the fleet operator 185 to update map constraints for the AVs 196. In doing so, the computing system 100 can receive, via the map constraint interface 180, a set of inputs configuring a set of constraint layers of one or more autonomy map documents 146 corresponding to one or more autonomy maps. The map constraint compiler 110, compression module 120 and constraint deployment module may then compile the autonomy map documents 146 comprising a set of updated map constraints corresponding to the configured set of constraint layers, into a document container, and output the document container to at least subset of AVs 196 to enable the subset of AVs 196 to integrate the set of updated map constraints with the on-board autonomy maps.

In certain implementations, the computing system 100 can include can include a conflict module 150 that can tabulate, in metadata of a given autonomy map document 146, a set of lane identifiers such as entry point identifiers and exit point identifiers of selected route portions to which a given set of map constraints apply. In further examples, the conflict module 150 can generate metadata for the document 146 indicating a creation time for the document, a number of constraint layers created, a number of constraints created, a number of shapes created, and/or the last time the document 146 was modified and deployed to AVs 196. Along these lines, the conflict module 150 can manage a set of audit logs for tracking the history of map constraint updates based on the generated metadata of each autonomy map document.

Autonomous Vehicle

Figure 2:
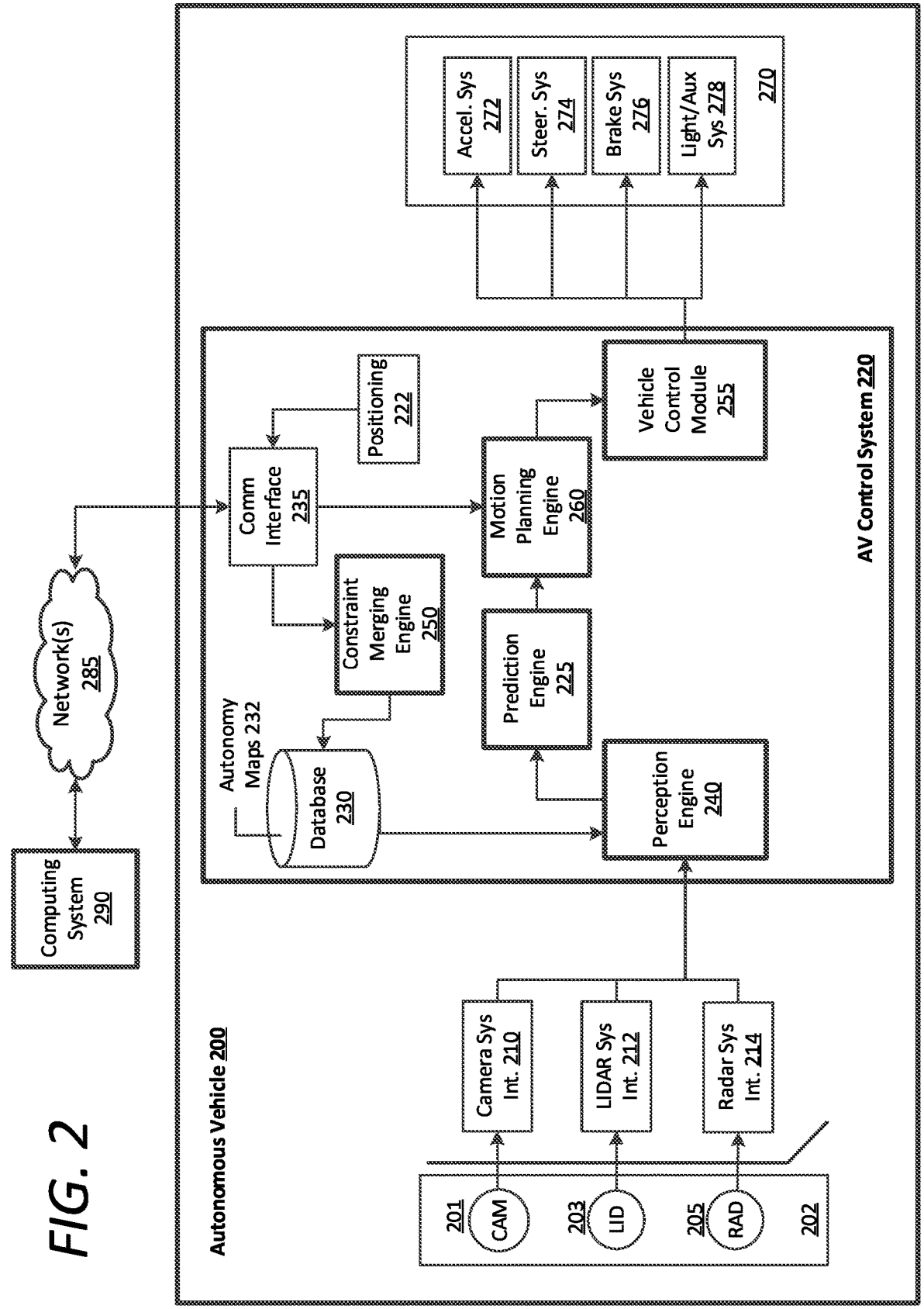
FIG. 2 depicts an example AV implementing map constraints, according to example embodiments of the present disclosure.

FIG. 2 is a block diagram illustrating an example autonomous vehicle in communication with on-demand transportation management computing systems 290, as described herein. In an example of FIG. 2, a control system 220 can autonomously operate the AV 200 in a given geographic region for a variety of purposes, including transport services (e.g., transport of humans, delivery services, etc.). In examples described, the AV 200 can operate autonomously without human control. For example, the AV 200 can autonomously steer, accelerate, shift, brake, and operate lighting components. Some variations also recognize that the AV 200 can switch between an autonomous mode, in which the AV control system 220 autonomously operates the AV 200, and a manual mode in which a safety driver takes over manual control of the acceleration system 272, steering system 274, braking system 276, and lighting and auxiliary systems 278 (e.g., directional signals and headlights).

According to some examples, the control system 220 can utilize specific sensor resources in order to autonomously operate the AV 200 in a variety of driving environments and conditions. For example, the control system 220 can operate the AV 200 by autonomously operating the steering, acceleration, and braking systems 272, 274, 276 of the AV 200 to a specified destination. The control system 220 can perform vehicle control actions (e.g., braking, steering, accelerating) and route planning using sensor information, as well as other inputs (e.g., transmissions from remote or local human operators, network communication from other vehicles, etc.).

In an example of FIG. 2, the control system 220 includes computational resources (e.g., processing cores and/or field programmable gate arrays (FPGAs)) which operate to process sensor data received from a sensor system 202 of the AV 200 that provides a sensor view of a road segment upon which the AV 200 operates. The sensor data can be used to determine actions which are to be performed by the AV 200 in order for the AV 200 to continue on a route to the destination, or in accordance with a set of transport instructions received from an computing system 290, such as the computing system 100 described with respect to FIG. 1. In some variations, the control system 220 can include other functionality, such as wireless communication capabilities using a communication interface 235, to send and/or receive wireless communications over one or more networks 285 with one or more remote sources. In controlling the AV 200, the control system 220 can generate commands to control the various control mechanisms 270 of the AV 200, including the vehicle's acceleration system 272, steering system 257, braking system 276, and auxiliary systems 278 (e.g., lights and directional signals).

The AV 200 can be equipped with multiple types of sensors 202 which can combine to provide a computerized perception, or sensor view, of the space and the physical environment surrounding the AV 200. Likewise, the control system 220 can operate within the AV 200 to receive sensor data from the sensor suite 202 and to control the various control mechanisms 270 in order to autonomously operate the AV 200. For example, the control system 220 can analyze the sensor data to generate low level commands executable by the acceleration system 272, steering system 257, and braking system 276 of the AV 200. Execution of the commands by the control mechanisms 270 can result in throttle inputs, braking inputs, and steering inputs that collectively cause the AV 200 to operate along sequential road segments according to a route plan.

In more detail, the sensor suite 202 operates to collectively obtain a live sensor view for the AV 200 (e.g., in a forward operational direction, or providing a 360-degree sensor view), and to further obtain situational information proximate to the AV 200, including any potential hazards or obstacles. By way of example, the sensors 202 can include multiple sets of cameras 201 (video cameras, stereoscopic cameras or depth perception cameras, long range monocular cameras), LIDAR sensors 203, one or more radar systems 205, and various other sensor resources such as sonar, proximity sensors, infrared sensors, and the like. According to examples provided herein, the sensors 202 can be arranged or grouped in a sensor system or array (e.g., in a sensor pod mounted to the roof of the AV 200) comprising any number of LIDAR, radar, monocular camera, stereoscopic camera, sonar, infrared, or other active or passive sensor systems.

Each of the sensors 202 can communicate with the control system 220 utilizing a corresponding sensor interface 210, 212, 214. Each of the sensor interfaces 210, 212, 214 can include, for example, hardware and/or other logical components which are coupled or otherwise provided with the respective sensor. For example, the sensors 202 can include a video camera and/or stereoscopic cameras 201 which continually generate image data of the physical environment of the AV 200. The cameras 201 can provide the image data for the control system 220 via a camera system interface 210. Likewise, the LIDAR sensors 203 can provide LIDAR data to the control system 220 via a LIDAR system interface 212. Furthermore, as provided herein, radar data from the radar system 205 of the AV 200 can be provided to the control system 220 via a radar system interface 214. In some examples, the sensor interfaces 210, 212, 214 can include dedicated processing resources, such as provided with field programmable gate arrays (FPGAs) which can, for example, receive and/or preprocess raw image data from the camera sensor.

In general, the sensor systems 202 collectively provide sensor data to a perception engine 240 of the control system 220. The perception engine 240 can access a database 230 comprising stored autonomy maps 232 of the given region in which the AV 200 operates. The autonomy maps 232 can comprise a series of road segment sub-maps corresponding to an autonomy grid map of a road network on which the AV is capable of operating. As provided herein, the autonomy maps 232 can comprise highly detailed ground truth data of each road segment of the autonomy grid. For example, the autonomy maps 232 can comprise prerecorded data (e.g., sensor data including image data, LIDAR data, and the like) by specialized mapping vehicles or other AVs with recording sensors and equipment, and can be processed to pinpoint various objects of interest (e.g., traffic signals, road signs, and other static objects). As the AV 200 travels along a given route, the perception engine 240 can access a current autonomy map of a current road segment to compare the details of the current autonomy map with the sensor data in order to detect and classify any objects of interest, such as moving vehicles, pedestrians, bicyclists, and the like.

In various examples, the perception engine 240 can dynamically compare the live sensor data from the AV's sensor systems 202 to the current localization map as the AV 200 travels through a corresponding road segment. The perception engine 240 can identify and classify any objects of interest in the live sensor data that can indicate a potential hazard. In accordance with many examples, the perception engine 240 can provide object of interest data to a prediction engine 225 of the control system 220, wherein the objects of interest in the object of interest data indicates each classified object that can comprise a potential hazard (e.g., a pedestrian, unknown objects, other vehicles, etc.).

Based on the classification of the objects in the object of interest data, the prediction engine 225 can predict a path of each object of interest and determine whether the AV control system 220 should respond or react accordingly. For example, the prediction engine 225 can dynamically calculate a collision probability for each object of interest, and generate event alerts if the collision probability exceeds a certain threshold. As described herein, such event alerts can be processed by the vehicle control module 255 and/or the motion planning engine 260, along with a processed sensor view indicating the classified objects within the live sensor view of the AV 200. The vehicle control module 255 can then generate control commands executable by the various control mechanisms 270 of the AV 200, such as the AV's acceleration, steering, and braking systems 272, 274, 276. In certain examples, the motion planning engine 260 can determine an immediate, low level trajectory and/or higher level plan for the AV 200 based on the event alerts and processed sensor view (e.g., for the next 100 meters or up to the next intersection).

On a higher level, the motion planning engine 260 can provide the vehicle control module 255 with a route plan to a given destination, such as a pick-up location, a drop off location, or other destination within the given region. According to examples described herein, the AV 200 can include a location-based resource, such as a positioning module 222 (e.g., a GPS receiver), that provides location data (e.g., periodic location pings) to the computing system 290 over the network(s) 285.

In various examples, the AV control system 220 can further include a constraint merging engine 250 that receives document containers from the computing system 290 over the network(s) 285 and merges the document images with corresponding autonomy maps 232 in the database 230 in order to update map constraints for the given region. As described herein, the perception engine 240 of the AV 200 can utilize the autonomy maps 230 stored on board the AV 200 to autonomously drive along various routes. As further described, the perception engine 240 can dynamically compare real-time sensor data from the sensor suite 202 to a corresponding autonomy map 232 to identify objects of interest while the control system 220 autonomously drives the AV 200 through a particular route segment—where each autonomy map 232 corresponds to a route segment (e.g., an intersection or a road segment between intersections), and may be initially recorded by sensors (e.g., stereoscopic cameras and/or LIDAR sensors) on recording vehicles or other AVs.

When a fleet manager makes changes to a particular autonomy map 232, the computing system 290 can transmit the document container comprising the flattened or compressed document images, and corresponding to the updated autonomy map 232 to the constraint merging engine 250 of the AV control system 220. The constraint merging engine 250 can access the database 230 for the corresponding autonomy map 232 (e.g., using a metadata indicator of the document container), and merge the document images with the corresponding autonomy map 232. Thereafter, the new constraints for the autonomy map configured by the fleet manager will be implemented when the AV 200 traverses a route segment corresponding to the updated autonomy map 232.

Autonomy Map Data

Figure 3:
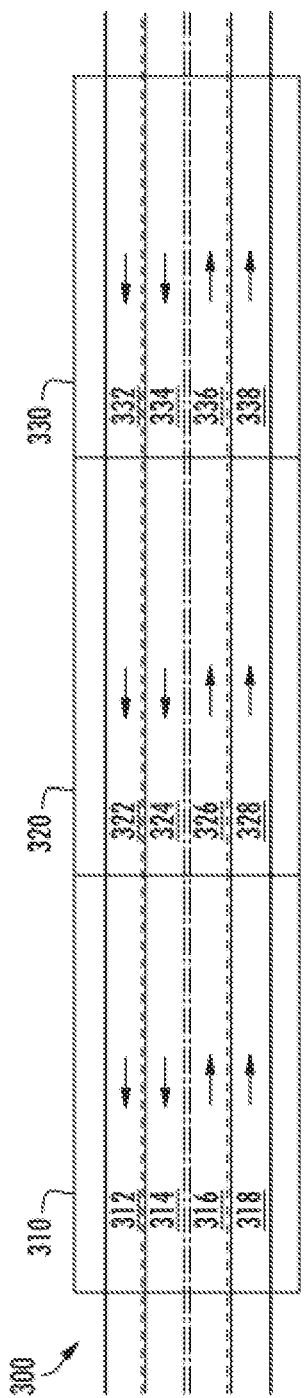
FIG. 3 depicts a first example aspect of map data including route portions, according to example embodiments of the present disclosure.
Figure 4:
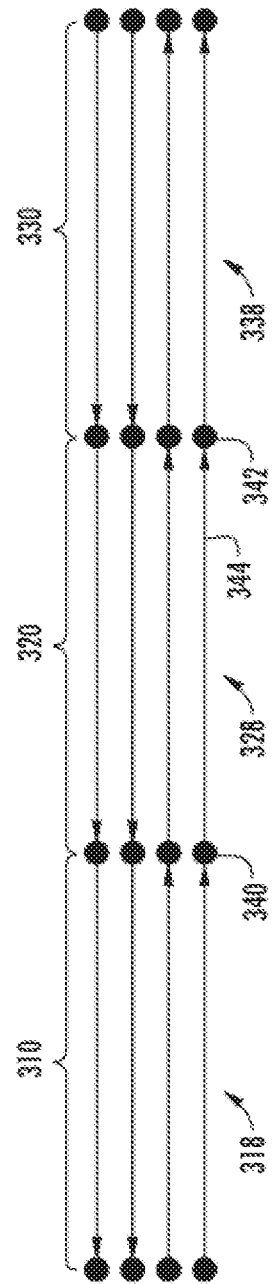
FIG. 4 depicts second example aspect of map data including route portions, according to example embodiments of the present disclosure.

FIGS. 3 and 4 depict first and second example aspects of autonomy map data, particularly autonomy map data relative to the illustrated route portions, according to example embodiments of the present disclosure. Autonomy maps can include a wealth of information regarding the identity and location of different routes (e.g., roads, road segments, lanes, lane segments, parking lanes, turning lanes, bicycle lanes, or other portions of a particular route), buildings, maintenance/service locations for the AVs, parking areas, traffic signs, traffic lights, traffic control devices, and/or any other map data that provides information that assists the AV control system 220 in comprehending and perceiving its surrounding environment and its relationship thereto. The particular identifiers discussed in FIGS. 3-4 for representing map data can also be used to represent constraint data and/or routes portions determined by the motion planning engine 260 of the AV control system 220.

Referring now to FIG. 3, information about each travel way within autonomy map data can be provided in detailed form. For instance, a portion of road 300 can be represented within an autonomy map 232 as a plurality of road segments 310, 320, and 330. Each road segment can respectively include one or more lanes. In the example of FIG. 3, road segment 310 includes two lane segments 312 and 314 associated with travel in a first direction and two lane segments 316 and 318 associated with travel in a second direction (e.g., opposing the first direction). Road segment 320 includes two lane segments 322 and 324 associated with travel in a first direction and two lane segments 326 and 328 associated with travel in a second direction (e.g., opposing the first direction). Road segment 330 includes two lane segments 332 and 334 associated with travel in a first direction and two lane segments 336 and 338 associated with travel in a second direction (e.g., opposing the first direction).

Referring now to FIG. 4, each route lane within the autonomy map 232 can be defined using additional and/or alternative data than depicted in FIG. 3. For instance, each travel way portion (e.g., lane segments 312-318, 322-328, 332-328) can include a lane segment identifier, a road segment identifier, a road identifier, a district identifier, a start point, an end point, a directionality vector indicating a direction of traffic flow between start and end points, and/or connectivity identifiers for other travel way portions that are predecessors and/or successors thereto. For example, lane segment 328 can be defined using lane segment identifier 328, road segment identifier 320, road identifier 300, start point 340, end point 342, a directionality vector 344 indicating the direction of traffic flow between start point 340 and end point 342, and an indication that lane segment 328 is connected to predecessor lane segment 318 (of road segment 310) and successor lane segment 338 (of road segment 330).

In some implementations, map data, constraint data, and/or travel routes can be identified in terms of particular coverage areas that include some or all of such data. For instance, travel way portion identifiers such as described, for example, in FIGS. 3-4 can be additionally identified in terms of what coverage area they are included in. By breaking a map down into different coverage areas, the disclosed systems and methods can more easily identify which portions of map data need to be evaluated relative to constraint data to update map constraints for AVs on specified travel routes.

Map Constraint Interface

Figure 5:
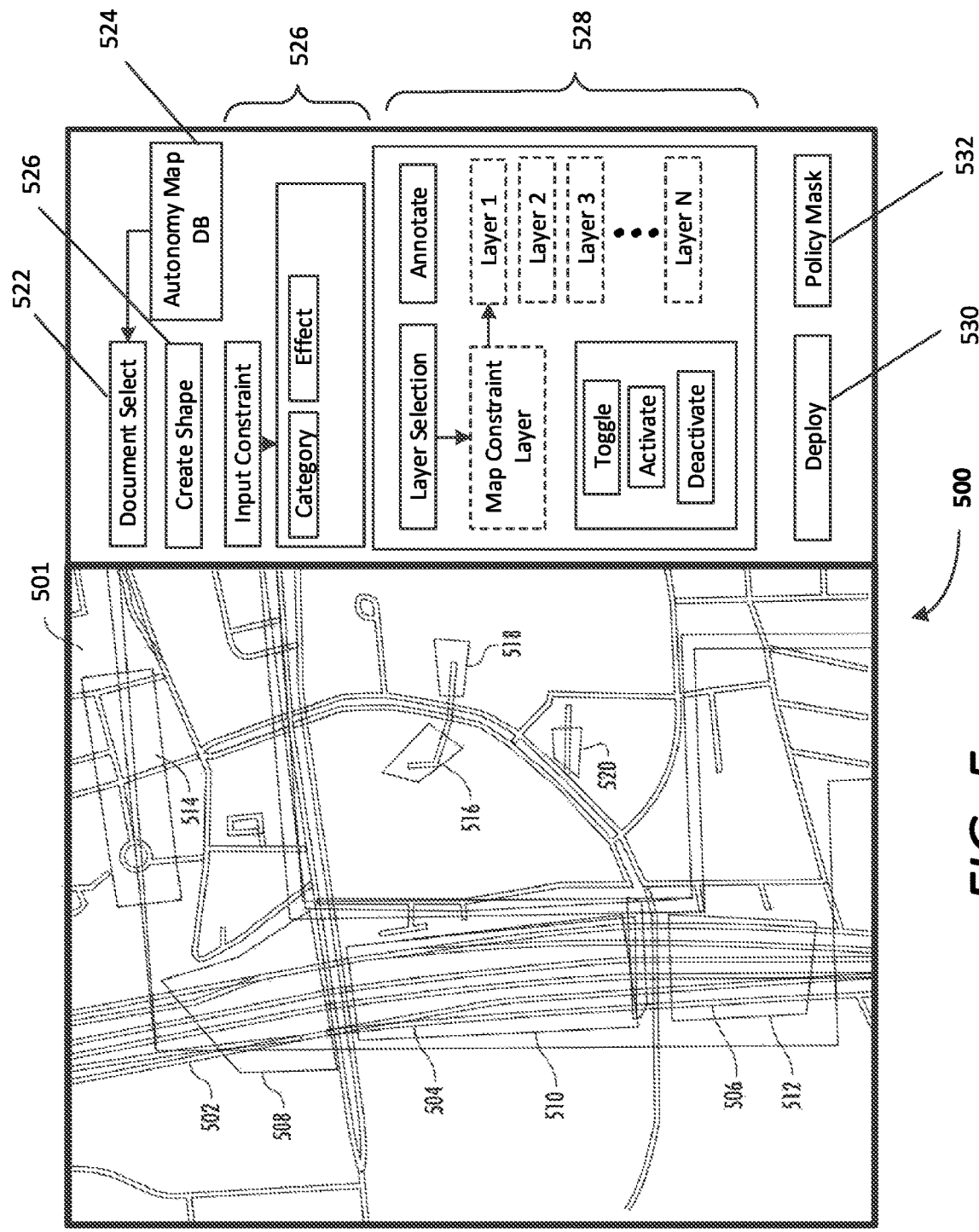
FIG. 5 depicts an example map constraint interface based on a unified document model, according to examples described herein.

FIG. 5 depicts an example map constraint interface 500 based on a unified document model, according to examples described herein. The map constraint interface 500 can include an autonomy map document selection feature 522 that enables the fleet operator to select an autonomy map document 501 from an autonomy map database 524. The selected autonomy map document 501 can be displayed and once selected, and the fleet operator can interact with various features 526, 528, 530 of the map constraint interface 500 to create a shape, and configure one or more constraints for the shape (e.g., utilizing a category and effect manifest 528). In the example shown, the fleet operator can configure shapes of the autonomy map document 501 (e.g., shapes 508, 510, 512, 514, 516, 518, 520) encompassing respective route segments of roads (e.g., roads 502, 504, 506, etc.), and utilize an input constraint feature 526 to select particular constraint categories and actual map constraints (e.g., effects) to be applied to each or any route segment encompassed by a particular shape.

In addition, the map constraint interface 500 can also enable the fleet operator to add, edit, or append existing shapes on the autonomy map document 501. For example, the map constraint interface 500 can include a layer configuration interface 528 that enables the operator to select a particular map constraint layer, provide annotations, toggle the layer to activate or deactivate the layer. When the constraint layers are configured and finalized, the operator can select a deploy feature 530 on the constraint interface 500, which can cause the document 501 to be flatten and/or compressed, compiled into a document container, and deployed to selected AVs.

Specifically, the fleet operator can configure any shape of a map constraint layer using the input constraint feature 526 and the layer configuration feature 528 of the map constraint interface (e.g., a polygon that includes a route segment or intersection). The fleet operator can overlay the configured shape on the autonomy map document 501. Within any category, the fleet operator can utilize the constraint feature 526 to select a particular constraint action or "effect" for the map constraint layer. For example, in the navigational constraint category, the fleet operator can select an effect comprising a forbidden routing constraint (e.g., the AV is forbidden to enter the route segment), an autonomy mode routing constraint (e.g., the AV is only permitted to operate through the route segment in manual mode), or a high-cost avoidance constraint (e.g., the map constraint establishes an artificial high risk cost for the route segment to induce the AV to search for route alternatives) to apply to the map constraint layer. The layer configuration feature 528 can further include a toggle feature, which the fleet operator can utilize to activate and deactivate the map constraint layer.

As an example, a route portion of the autonomy map document 501 may be overlaid with multiple map constraint layers. In the navigational constraint category, the selected route portion may be overlaid with a forbidden routing constraint layer and an autonomy mode routing constraint layer. To prevent conflicting layers, the layers can be configured in accordance with a subsumption order (e.g., either manually configured by the fleet operator or automatically applied by the map constraint compiler 110 of the computing system 100 in FIG. 1). The subsumption order comprises a hierarchy to which the AV is to treat the multiple layers. For example, the forbidden routing constraint layer, when activated, can override all lower order subsumption layers in the navigational constraint category for the particular route portion.

As described herein, the input constraint feature 526 and the layer configuration feature 528 of the map constraint interface 500 enable the fleet operator to apply any number of map constraint layers, in any shape, to any particular autonomy map document 501. Furthermore, each map constraint layer can readily be activated or deactivated using a toggle feature on the map constraint interface 501. Thus, for a given autonomy map document 501, the fleet operator can configure route portions on the autonomy map document 501 to be layered with various map constraints of different categories (e.g., navigational constraints, perception constraints, prediction constraints, etc.), each toggled as activated or deactivated. In various examples, the fleet operator may also utilize the layer configuration feature 528 to provide targeted annotations readable by the control systems of the AVs, which can provide the AV with contextual information that can affect one or more AV operations (e.g., perception, prediction, or motion planning). For example, the fleet operator can provide annotations indicating a blind driveway or a pothole for the perception operations of the AV. As another example, the fleet operator can provide annotations indicating a frequent deer crossing for both perception and prediction operations of the AV. In certain implementations, the map constraint interface 500 can further enable the fleet operator 185 to select particular AVs to which the updated autonomy map document is to be sent.

In accordance with embodiments described herein, the map constraint interface 500 can provide access to an autonomy map database 524 comprising a series of autonomy map documents readily editable by the fleet operator in the manner described herein. Thus, the fleet operator can access any autonomy map document and, for example, toggle (activate or deactivate) existing map constraint layers, create new map constraint layers, and provide annotations for any route portion of the autonomy grid map. For example, if a construction project is scheduled for a certain route segment, the fleet operator can access the corresponding autonomy map document via the map constraint interface 500, and append an annotation to the document indicating the construction zone, and/or activate a particular navigational constraint to either forbid the AVs from entering the construction zone, or cause the AV to be routed around the construction zone.

In certain implementations, the map constraint interface 500 may also provide a policy mask feature 532, that enables the fleet operator to override an entire existing policy utilized by the AVs. For example, an AV may operate in accordance with an existing policy using an autonomy map for a current route segment. The existing policy can comprise a set of labels and or rules (e.g., initial map constraints) that the AV must abide by when traversing the current route segment. The map constraint interface can provide a policy mask feature 532 that causes the entire policy to be overridden in favor of an updated policy (or a new set of map constraints).

Methodology

Figure 6:
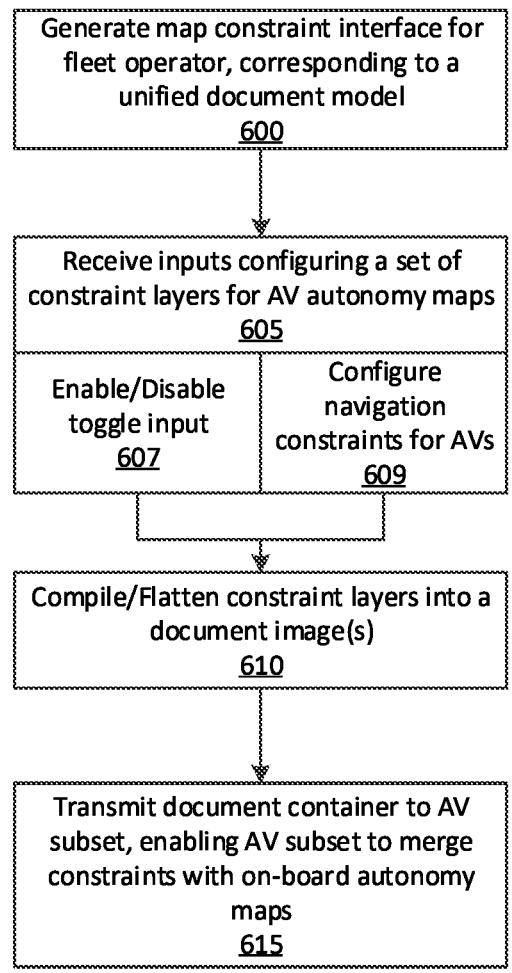
FIG. 6 is a flow chart describing an example process of outputting map constraints to AVs, according to various examples.

FIG. 6 is a flow chart describing an example process of outputting map constraints to AVs, according to various examples. In the below description of FIG. 6, reference may be made to reference characters representing like features as shown and described with respect to FIGS. 1 through 5. Furthermore, the steps shown and described with respect to FIG. 6 need not be performed in any particular order, but rather may be performed in any practical order consistent with the description herein. Certain steps described may also be optional or omitted from the disclosed process of FIG. 6.

Referring to FIG. 6, the computing system 100 can generate a map constraint interface 500 for a fleet operator 185, which can correspond to a unified document model implemented by the computing system 100 (600). In various examples, the computing system 100 can receive inputs configuring a set of constraint layers for one or more AV autonomy maps 232 (605). The inputs can correspond to the fleet operator 185 configuring navigation constraints on a particular autonomy map document 146 (609). For example, the fleet operator 185 can interact with the map constraint interface 500 to add, edit, or append a particular shape overlaying one or more road segments of the autonomy map 232. The fleet operator 185 may also input one or more effects for any particular shape, and once completed, can enable or disable a toggle feature of the layer configuration interface 528 to activate or deactivate a particular layer or effect (607).

When the fleet operator 185 deploys the configured autonomy map document 146, the computing system 100 can flatten, and/or compress the constraint layers into one or more document images, and compile the one or more document images in a document container (610). The computing system 100 may then transmit the document container to at least a subset of the AVs 196 operating throughout a given region (615). Accordingly, the unified document model enables fleet operators and managers to provide over-the-air routing and navigation constraints to AVs 196 in real-time as opposed to, for example, deploying extra mapping vehicles to create whole new autonomy maps whenever a constraint change is needed for a particular road segment.

Hardware Diagrams

Figure 7:
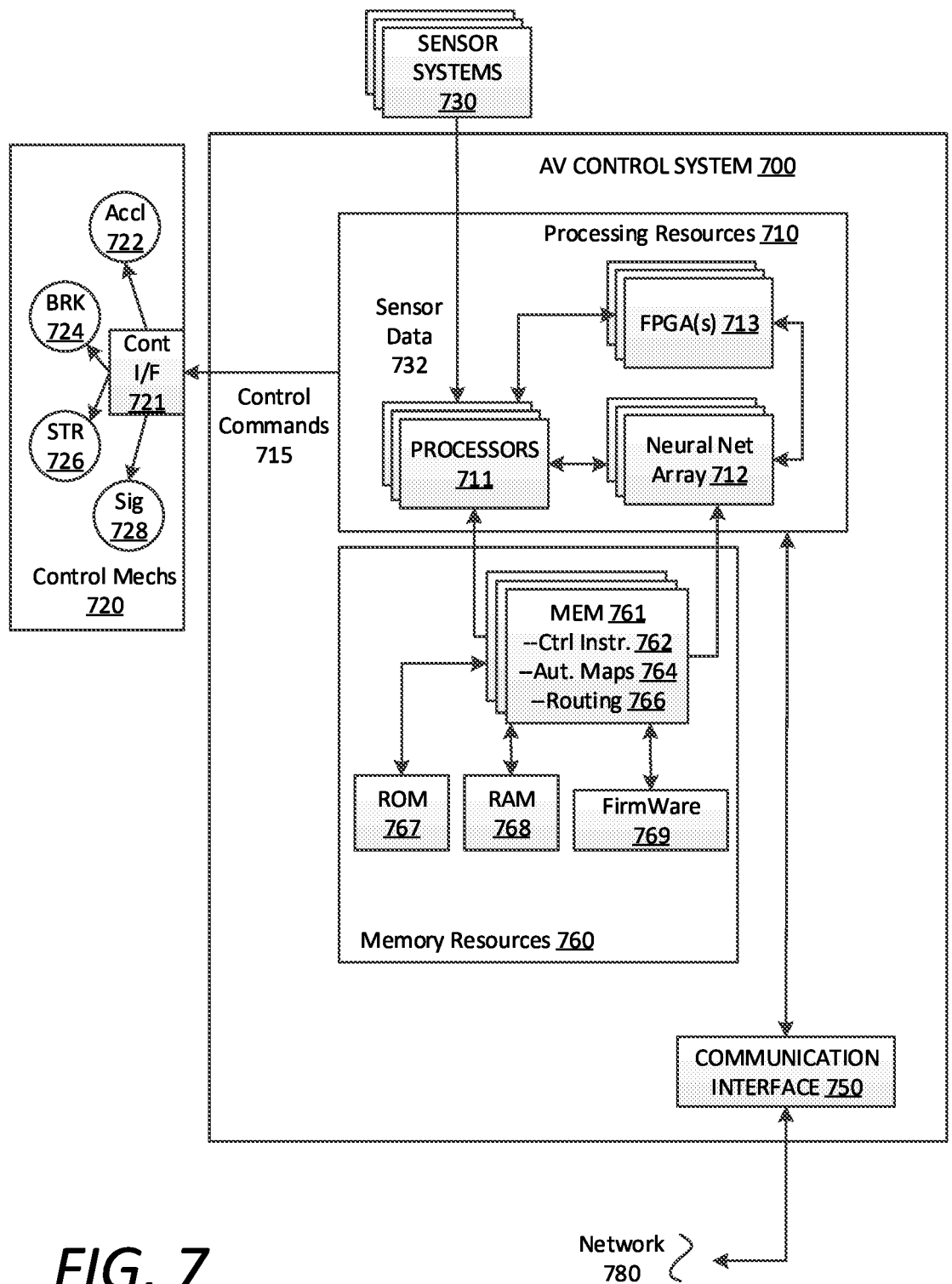
FIG. 7 is a block diagram illustrating a computer system upon which example AV processing systems described herein may be implemented.

FIG. 7 is a block diagram illustrating a computer system upon which example AV processing systems described herein may be implemented. The computer system 700 can be implemented using a number of processing resources 710, which can comprise processors 711, field programmable gate arrays (FPGAs) 713, graphics processing units (GPUs), and the like. In some aspects, any number of processors 711 and/or FPGAs 713 of the computer system 700 can be utilized as components of a neural network array 712 implementing one or more machine learning models and utilizing road network maps stored in memory 761 of the computer system 700. In the context of FIG. 2, various aspects and components of the AV control system 220 can be implemented using one or more components of the computer system 700 shown in FIG. 7.

According to some examples, the computer system 700 may be implemented within an AV with software and hardware resources such as described with examples of FIG. 2. In an example shown, the computer system 700 can be distributed spatially into various regions of the AV, with various aspects integrated with other components of the AV itself. For example, the processing resources 710 and/or memory resources 760 can be provided in a cargo space of the AV. The various processing resources 710 of the computer system 700 can also execute control instructions 762 using microprocessors 711, FPGAs 713, a neural network array 712, or any combination of the same.

In an example of FIG. 7, the computer system 700 can include a communication interface 750 that can enable communications over a network 780. In one implementation, the communication interface 750 can also provide a data bus or other local links to electro-mechanical interfaces of the vehicle, such as wireless or wired links to and from control mechanisms 720 (e.g., via a control interface 721), sensor systems 730, and can further provide a network link to a backend transport management system or a remote assistance system (implemented on one or more datacenters) over one or more networks 780.

The memory resources 760 can include, for example, main memory 761, a read-only memory (ROM) 767, storage device, and cache resources. The main memory 761 of memory resources 760 can include random access memory (RAM) 768 or other dynamic storage device, for storing information and instructions which are executable by the processing resources 710 of the computer system 700. The processing resources 710 can execute instructions for processing information stored with the main memory 761 of the memory resources 760. The main memory 761 can also store temporary variables or other intermediate information which can be used during execution of instructions by the processing resources 710. The memory resources 760 can also include ROM 767 or other static storage device for storing static information and instructions for the processing resources 710. The memory resources 760 can also include other forms of memory devices and components, such as a magnetic disk or optical disk, for purpose of storing information and instructions for use by the processing resources 710. The computer system 700 can further be implemented using any combination of volatile and/or non-volatile memory, such as flash memory, PROM, EPROM, EEPROM (e.g., storing firmware 769), DRAM, cache resources, hard disk drives, and/or solid-state drives.

The memory 761 may also store autonomy maps 764 in which the processing resources 710—executing the control instructions 762—can continuously compare to sensor data from the various sensor systems 730 of the AV. Execution of the control instructions 762 can cause the processing resources 710 to generate control commands 715 in order to autonomously operate the AV's acceleration 722, braking 724, steering 726, and signaling systems 728 (collectively, the control mechanisms 720). Thus, in executing the control instructions 762, the processing resources 710 can receive sensor data 732 from the sensor systems 730, dynamically compare the sensor data 732 to a current autonomy map 764, and generate control commands 715 for operative control over the acceleration, steering, and braking of the AV. The processing resources 710 may then transmit the control commands 715 to one or more control interfaces 721 of the control mechanisms 720 to autonomously operate the AV through road traffic on roads and highways, as described throughout the present disclosure.

The memory 761 may also store routing information 766 that the processing resources 710 can utilize to determine routes for the AV to any given destination. In certain examples described herein, the routing information 766 can further be provided to a network computing system 100 to enable the network computing system 100 to select or filter out the AV as a candidate to service transport requests.

Figure 8:
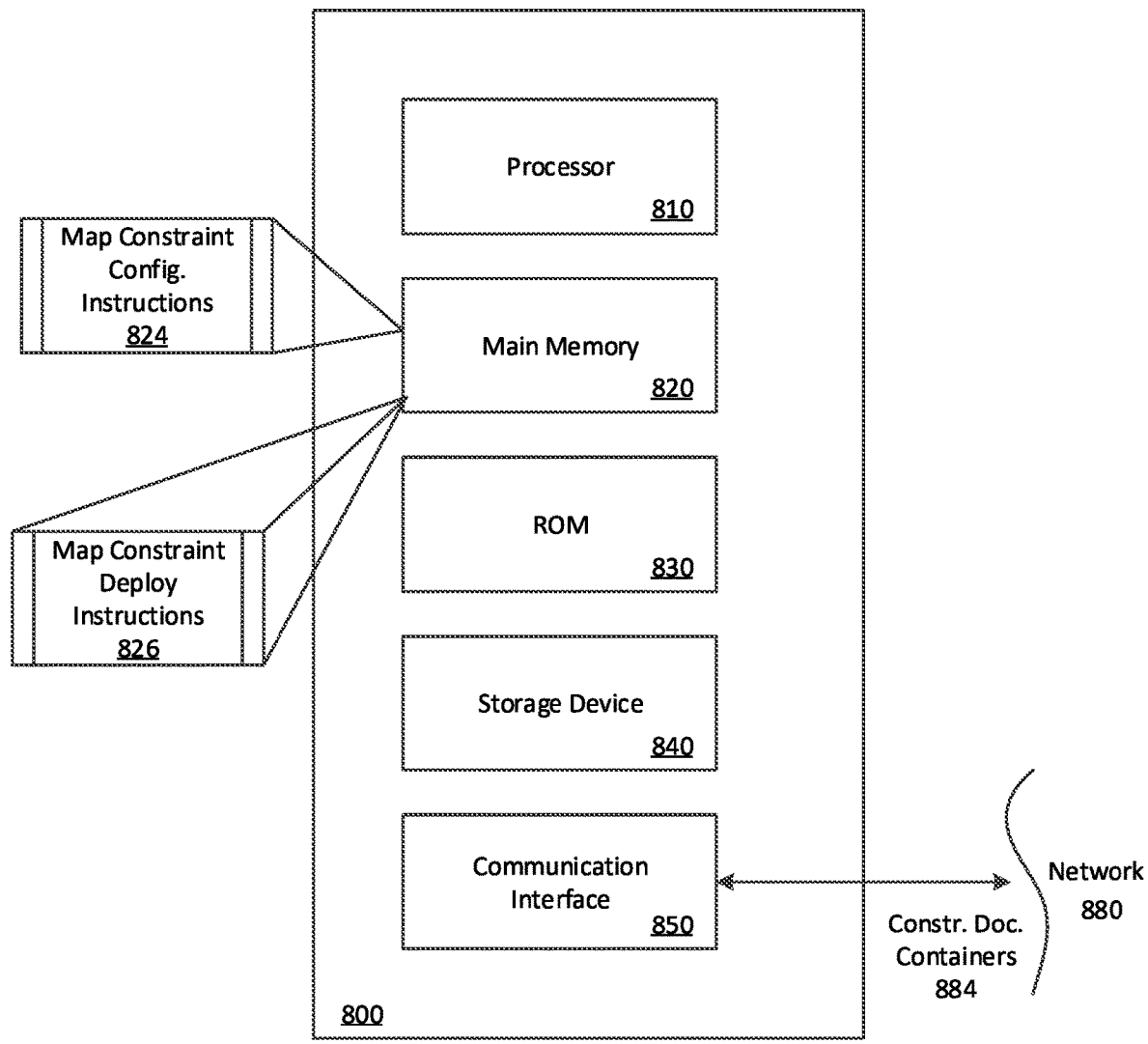
FIG. 8 is a block diagram that illustrates a computer system upon which examples described herein may be implemented.

FIG. 8 is a block diagram that illustrates a computer system upon which examples described herein may be implemented. A computer system 800 can be implemented on, for example, a server or combination of servers. For example, the computer system 800 may be implemented as part of a network service for providing transportation services. In the context of FIGS. 1 and 2, the network computing system 100, 290 may be implemented using a computer system 800 such as described by FIG. 8.

In one implementation, the computer system 800 includes processing resources 810, a main memory 820, a read-only memory (ROM) 830, a storage device 840, and a communication interface 850. The computer system 800 includes at least one processor 810 for processing information stored in the main memory 820, such as provided by a random-access memory (RAM) or other dynamic storage device, for storing information and instructions which are executable by the processor 810. The main memory 820 also may be used for storing temporary variables or other intermediate information during execution of instructions to be executed by the processor 810. The computer system 800 may also include the ROM 830 or other static storage device for storing static information and instructions for the processor 810. A storage device 840, such as a magnetic disk or optical disk, is provided for storing information and instructions.

The communication interface 850 enables the computer system 800 to communicate over one or more networks 880 (e.g., cellular network) through use of the network link (wireless or wired). Using the network link, the computer system 800 can communicate with one or more computing devices, one or more servers, and/or one or more AVs. The executable instructions stored in the memory 820 can include selection and map constraint configuration instructions 824, which enables the computer system 800 to provide a map constraint interface and receive inputs to amend autonomy map documents from a fleet operator. The instructions can further include map constraint deployment instructions 826 which enables the computer system 800 to compress edited autonomy map documents into document images or snapshots and compiled for transmission to AVs for integration into existing autonomy maps.

The processor 810 is configured with software and/or other logic to perform one or more processes, steps and other functions described with implementations, such as described with respect to FIGS. 1-4, and elsewhere in the present application. Examples described herein are related to the use of the computer system 800 for implementing the techniques described herein. According to one example, those techniques are performed by the computer system 800 in response to the processor 810 executing one or more sequences of one or more instructions contained in the main memory 820. Such instructions may be read into the main memory 820 from another machine-readable medium, such as the storage device 840. Execution of the sequences of instructions contained in the main memory 820 causes the processor 810 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel. Furthermore, computing tasks discussed herein as being performed at computing device(s) remote from the vehicle can instead be performed at the vehicle (e.g., via the vehicle computing system), or vice versa. Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system comprising:
   a communication interface communicating, over one or more networks, with autonomous vehicles (AVs) that utilize autonomy maps to navigate throughout a given region;
   one or more processors; and
   one or more memory resources storing instructions that, when executed by the one or more processors, cause the computing system to:
   generate a map constraint interface enabling a fleet operator to update map constraints for the AVs, the map constraint interface corresponding to a unified document model enabling the fleet operator to configure a set of constraint layers of one or more of the autonomy maps, each constraint layer in the set of constraint layers comprising a toggle feature that enables the fleet operator to activate and deactivate the constraint layer;
   receive, via the map constraint interface, a set of inputs configuring the set of constraint layers of the one or more autonomy maps;
   compile a set of updated map constraints, corresponding to the configured set of constraint layers, into a document container; and
   output, via the communication interface over the one or more networks, the document container to a subset of the AVs to enable the subset of AVs to integrate the set of updated map constraints with the one or more autonomy maps.

2. The computing system of claim 1, wherein map constraint interface enables the fleet operator to configure select route portions in the one or more autonomy maps upon which the set of updated map constraints apply.

3. The computing system of claim 2, wherein the set of constraint layers comprises at least one navigational constraint layer that controls navigational constraints for the subset of AVs on the select route portions included in the one or more autonomy maps.

4. The computing system of claim 3, wherein the at least one navigational constraint layer comprises at least one of a forbidden routing constraint, an autonomy mode routing constraint, or a high-cost avoidance constraint applicable to the select route portions.

5. The computing system of claim 4, wherein the autonomy mode routing constraint, when enabled, allows for manual operation of the subset of AVs through the select route portions.

6. The computing system of claim 4, wherein the forbidden routing constraint, when enabled, forbids the subset of AVs from operating through the select route portions.

7. The computing system of claim 2, wherein the map constraint interface enables the fleet operator to configure the select route portions by generating a shape on an autonomy map document corresponding to an affected autonomy map on which the set of updated map constraints apply, the shape encompassing the select route portions.

8. The computing system of claim 7, wherein the executed instructions cause the computing system to tabulate, in metadata of the document container, a set of lane identifiers of the select route portions.

9. The computing system of claim 8, wherein the set of lane identifiers comprises entry point identifiers and exit point identifiers for each lane of the select route portions.

10. The computing system of claim 7, wherein the executed instructions cause the computing system to further generate metadata for the document container indicating at least one of a creation time for the document container, a number of constraint layers created, a number of constraints created, or a number of shapes created.

11. The computing system of the 10, wherein the executed instructions further cause the computing system to:
   manage a set of audit logs for tracking history of map constraint updates based on the generated metadata of each compiled document container.

12. The computing system of claim 1, wherein the map constraint interface enables the fleet operator to configure a set of subsumption rules for the set of constraint layers, the set of subsumption rules comprising a control hierarchy for applying the set of updated map constraints on-board the subset of AVs.

13. The computing system of claim 1, wherein prior to receiving the document container, the subset of AVs navigate according to a set of existing policies associated with the autonomy maps, and wherein integration of the document container by the subset of AVs causes the subset of AVs to update the set of existing policies to include the set of updated map constraints.

14. The computing system of claim 13, wherein the map constraint interface enables the fleet operator to configure one or more policy masks that override one or more corresponding policies in the set of existing policies.

15. The computing system of claim 1, wherein the set of constraint layers comprises a plurality of map constraint categories, each map constraint category of the plurality of map constraint categories comprising one or more constraint layers.

16. The computing system of claim 15, wherein the plurality of map constraint categories comprises one or more of a navigational constraint category, a perception constraint category, or an object prediction constraint category.

17. The computing system of claim 1, wherein the map constraint interface enables the fleet operator to select the subset of AVs to which the set of updated map constraints will apply.

18. The computing system of claim 1, wherein the map constraint interface enables the fleet operator to input annotations into the constraint layer, the inputted annotations being readable by the subset of AVs to provide the subset of AVs with contextual information regarding one or more map constraints included in the constraint layer.

19. A non-transitory computer readable medium storing instructions that, when executed by one or more processors, cause the one or more processors to:
generate a map constraint interface enabling a fleet operator to update map constraints for autonomous vehicles (AVs), the map constraint interface corresponding to a unified document model enabling the fleet operator to configure a set of constraint layers of one or more autonomy maps utilized by the AVs for navigation, each constraint layer in the set of constraint layers comprising a toggle feature that enables the fleet operator to activate and deactivate the constraint layer;
receive, via the map constraint interface, a set of inputs configuring the set of constraint layers of the one or more autonomy maps;
compile a set of updated map constraints, corresponding to the configured set of constraint layers, into a document container; and
output, via a communication interface over one or more networks, the document container to a subset of the AVs to enable the subset of AVs to integrate the set of updated map constraints with the one or more autonomy maps.

20. A computer-implemented method of outputting map constraints to autonomous vehicles (AVs), the method being performed by one or more processors and comprising:
generating a map constraint interface enabling a fleet operator to update map constraints for autonomous vehicles (AVs), the map constraint interface corresponding to a unified document model enabling the fleet operator to configure a set of constraint layers of one or more autonomy maps utilized by the AVs for navigation, each constraint layer in the set of constraint layers comprising a toggle feature that enables the fleet operator to activate and deactivate the constraint layer;
receiving, via the map constraint interface, a set of inputs configuring the set of constraint layers of the one or more autonomy maps;
compiling a set of updated map constraints, corresponding to the configured set of constraint layers, into a document container; and
outputting, via a communication interface over one or more networks, the document container to a subset of the AVs to enable the subset of AVs to integrate the set of updated map constraints with the one or more autonomy maps.

* * * * *